May 6, 1930.  F. C. HEBERT  1,757,427
RIM TOOL
Filed June 13, 1927
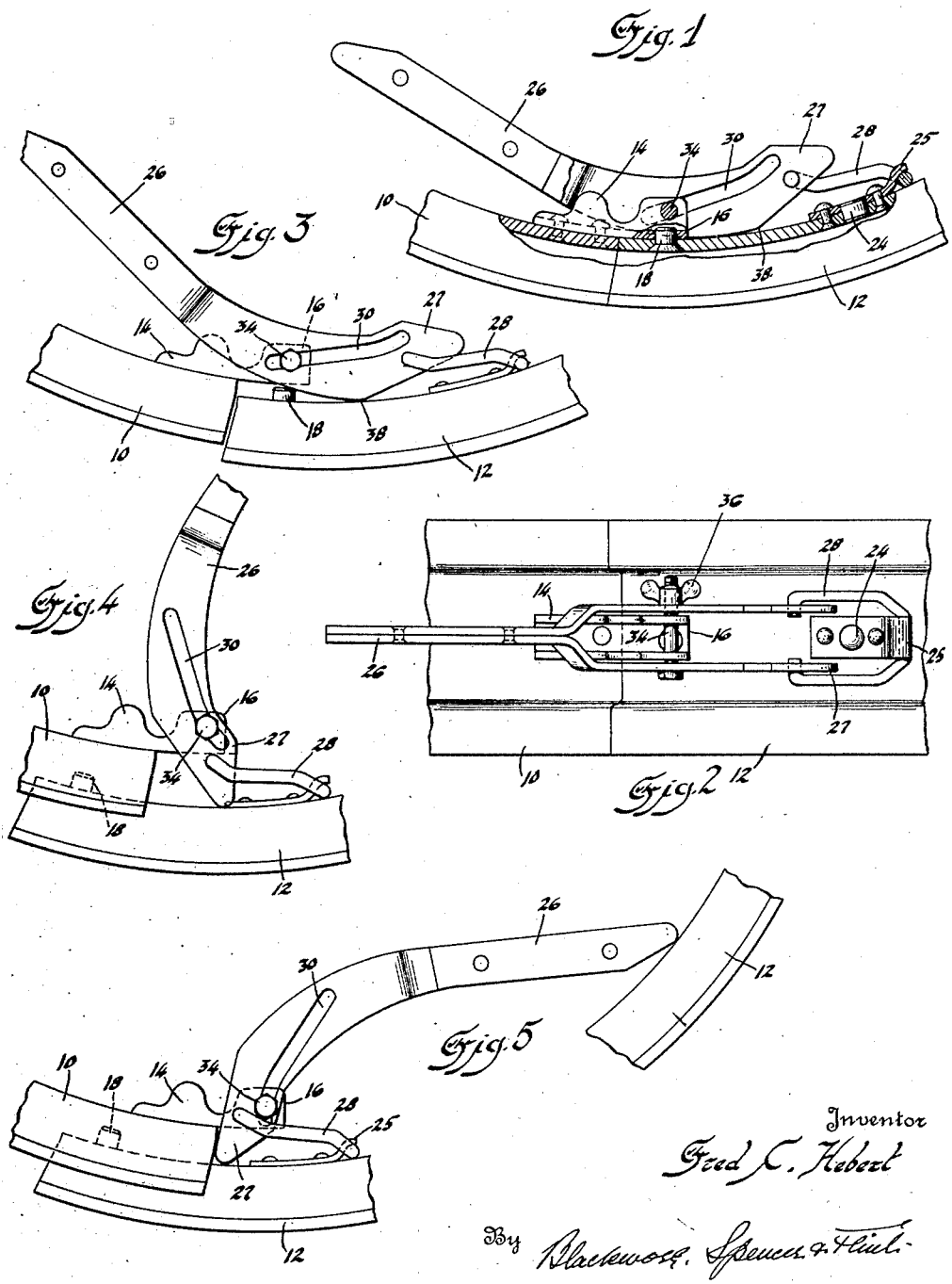
Inventor
Fred C. Hebert
By Blackwood, Spencer & Hunt
Attorneys Patented May 6, 1930

1,757,427

UNITED STATES PATENT OFFICE

FRED C. HEBERT, OF JACKSON, MICHIGAN, ASSIGNOR TO GENERAL MOTORS CORPORATION, OF DETROIT, MICHIGAN, A CORPORATION OF DELAWARE

RIM TOOL

Application filed June 13, 1927. Serial No. 198,457.

This invention relates to an operating tool for a demountable rim.

Rims of this type are ordinarily split transversely, so that when it becomes necessary to change a tire, the rim is "broken" at the split and contracted sufficiently that a tire may be readily taken off or put on. Much difficulty has been experienced in performing this operation, especially in the case of rims for large tires, as the tire and rim are both under considerable tension tending to hold the rim tightly in its normal expanded or operating position.

Heretofore it has been a common practice to provide a tool as an integral or inseparable part of the rim. This practice has the disadvantage of making necessary the duplication of parts, four or five tools being necessary when one should suffice. A further disadvantage of this practice is that the fixed tool interferes with the mounting of the rim on the wheel and adds considerable weight at the periphery of each wheel, a place where lightness is a most important feature.

In the design of a rim tool, it is desirable to have the tool detachable, and readily so, so that only one tool will be necessary. As in the case of any tool, it is necessary that it be sufficiently strong, yet it is desirable that it be simple and light in construction so that it may be cheaply manufactured. In the interest of economy and in order that the rim may be readily mounted and demounted, it is desirable that the tool should be adapted for use on a rim with a minimum change in the construction of the rim itself. In carrying out this idea, it is an object of my invention to make my rim tool self-locking so that cooperating locking lugs on the rim on opposite sides of the split will be unnecessary.

It is the object of this invention to provide a detachable rim tool with the advantages enumerated, one which may be quickly fixed in place on the rim, and which, by a single stroke of the handle, will "break" the rim, move the parts to contract the rim so that the tire may be removed, and, by virtue of a past dead center portion, hold the rim in contracted position. This latter point I consider an important feature as it does away with the necessity of cooperating locking lugs on the two parts of the rim and further insures that a single movement of the handle will unlock the rim from contracted position so that the tool may be readily removed.

Other objects of the invention will occur in the course of the following description, taken in connection with the accompanying drawing and appended claims.

In the drawing:

Figure 1 is a side elevation, with parts broken away, showing the tool in position with that part of the rim adjacent the split in normal or operating position.

Figure 2 is a plan view of the structure shown in Figure 1.

Figure 3 is a side elevation showing the tool in position just after the split in the rim has been broken, but before the tool has moved the parts farther toward contracted position.

Figure 4 is a side elevation similar to Figure 3 but showing the tool and rim in position midway between the position shown in Figure 3 and contracted position.

Figure 5 is a side elevation showing the tool and rim locked in full contracted position.

Referring to the drawing, the numeral 10 indicates the part of an ordinary rim which is on one side of the split while the numeral 12 indicates that part of the rim on the other side of the split. Fixed, by rivets or otherwise, to the part 10 is a lug 14 provided with laterally spaced radially extending flanges. I have illustrated this lug as U-shaped, as viewed from the side, so that the bolt used for connecting the rim to the wheel may be extended therethrough but this feature is incidental. The U-shape is not material to the present case. The flanged lug 14 has a portion 16 extending circumferentially a short distance over the part 12 of the rim. This part 16 is provided with an aperture fitting over the centering lug 18 fixed to the part 12 of the rim and extending radially inward therefrom. The flanges of the part 16 are provided with coaxial bolt holes for reception of the pin 34. A lug 24 is riveted or otherwise fixed to the part 12 of the rim and has a bent up portion 25 on the side of the rim away from the split.

The rim tool per se comprises a substantially arcuate forked operating lever, comprising a handle 26 and forked operating end 27, and a bail-shaped link 28, pivoted to the forked operating end. Each fork of the lever is provided with a slot 30 extending longitudinally thereof, the slots being of equal length and even with each other. The forks of the lever are spaced wide enough to fit outside of the flanged portion 16 of the lug 14.

In the normal use of the rim, the tool and pin 34 are not in place as illustrated. When the rim tool is to be used, the rim is removed from the wheel (not shown) and the tool fixed in place. The tool is held in place by the pin 34 extending through the slots 30 in the forks of the lever and through the coaxial bolt holes in the flanges of the part 16 of the lug 14. The nut 36 is fastened loosely so that the operating lever may slide freely on the pin 34 the length of the slots 30. The slots 30 are ordinarily long enough that when the lever is in its extreme position to the right, as shown in the drawing, the bight of the bail 28 extends beyond the lug 24 and may slip readily under the bent up end 25 of the lug. At a point on the outer part of the arcuate lever and substantially midway between the ends of the slots 30 I have modified the normal curve of the arcuate lever in order to provide a fixed fulcrum point 38.

The operation of my device is as follows: With the parts in position as illustrated in Figure 1, the operating lever is moved upward, or in a clockwise direction, to the position illustrated in Figure 3. During this movement the fulcrum 38 bears against the part 12 of the rim and force is applied through the pin 34 to the flanged part 16 of the lug 14 to move the part 10 radially inward relative to the part 12. As the handle is moved farther in a clockwise direction the axis about which the lever rotates shifts from the point 38 to the pivotal connection between the bail 28 and the forked operating end of the lever. During this clockwise movement of the lever the pin 34 moves in a figure about the shifting axis as described and tends to move the part 10 both inward and to the right, as shown in the drawing, relative to the part 12. After the position illustrated in Figure 3 is reached, however, the part 10 moves radially inward but little, as the pin 34 slides outward in the slots 30, or downward as shown in Figures 4 and 5. As the lever is moved farther on to the position shown in Figure 5, the pin 34 moves to the bottom of the slots 30. In this position the rim is contracted and is under a tension which tends to separate the parts 10 and 12, or, in other words, to move the part 10 to the left relative to the part 12, as viewed in the drawings. A further tendency is for the part 10 to move radially outward to a position even with the part 12. In the position illustrated in Figure 5, however, the pin 34 is substantially radially even with or a slight distance farther out than the pivotal connection of the bail with the operating end 27 of the forked lever. As the contact of the handle 26 of the lever prevents further rotation clockwise, the lever is held locked in position. After the tire has been changed the lever is moved back till it becomes loose and is removed from the rim by removal of the bolt 34.

It is obvious from the foregoing disclosure that the operating lever is forked to give added strength and stability and that the bail 28 is used for the same reason. While a non-forked lever and a single link instead of the bail would not be so strong nor would it operate so well, still I consider this equivalent within the scope of the foregoing disclosure. While I have illustrated the rim tool as readily detachable, I realize that it may be possible to design the parts so that they may be left on the rim, instead of detached, without interferring with mounting the rim on the wheel, and I desire the appended claims to be constructed with this fact in mind.

I claim:

1. A rim tool comprising a lever formed with a forked end, a bail pivotally connected with said forked end, said end being formed with registering lengthwise extending slots, and a pin extending through said slots for connecting said lever with a rim, said slots being so arranged as to make a pivotal connection with a part rigid with one end of the rim while the free end of the lever projects into engagement with the other end of the rim so that the first movement of the lever is pivotal to break the rim and the further sliding pivotal motion of the lever laps the rim ends.

2. A rim tool comprising a lever having a link pivotally connected thereto adjacent one end, said lever being formed with a slot extending to a point substantially even with and to one side of the pivotal connection of said link and lever and means cooperating with said slot for providing a shifting pivotal connection with a split rim, said slot being so arranged as to make a pivotal connection with a part rigid with one end of the rim while the free end of the lever projects into engagement with the other end of the rim so that the first movement of the lever is pivotal to break the rim and the further sliding pivotal motion of the lever laps the rim ends.

3. A rim tool comprising a lever having a substantially arcuate portion, a slot in said portion for providing a shifting pivotal connection directly with a split rim, and a pivot member connected with the lever adjacent and to one side of the end of the slot, said slot being so arranged as to make a pivotal connection with a part rigid with one end of the rim while the free end of the lever projects into engagement with the other end of the rim so that the first movement of the lever is pivotal to break the rim and the further sliding pivotal motion of the lever laps the rim ends.

In testimony whereof I affix my signature.
FRED C. HEBERT.